United States Patent
DeMint et al.

(10) Patent No.: US 11,498,748 B2
(45) Date of Patent: Nov. 15, 2022

(54) PALLET WITH ROLLS OF REINFORCEMENT MATERIAL

(71) Applicant: Owens Corning Intellectual Capital, LLC, Toledo, OH (US)

(72) Inventors: Tom W. DeMint, Seattle, WA (US); Jeff R. Randall, Monmouth, ME (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 234 days.

(21) Appl. No.: 16/645,641

(22) PCT Filed: Oct. 31, 2018

(86) PCT No.: PCT/US2018/058377
§ 371 (c)(1),
(2) Date: Mar. 9, 2020

(87) PCT Pub. No.: WO2019/108335
PCT Pub. Date: Jun. 6, 2019

(65) Prior Publication Data
US 2020/0277128 A1    Sep. 3, 2020

Related U.S. Application Data

(60) Provisional application No. 62/591,867, filed on Nov. 29, 2017.

(51) Int. Cl.
*B65D 85/672* (2006.01)
*B65B 11/02* (2006.01)
*B65D 71/00* (2006.01)

(52) U.S. Cl.
CPC ............ *B65D 85/672* (2013.01); *B65B 11/02* (2013.01); *B65D 71/0096* (2013.01); *B65D 2571/00061* (2013.01)

(58) Field of Classification Search
CPC .............. B65D 85/672; B65D 71/0096; B65D 2571/00061; B65B 11/02
See application file for complete search history.

(56) References Cited

U.S. PATENT DOCUMENTS 3,458,966 A * 8/1969 Hullhorst .............. B65B 63/028
53/436
3,546,846 A * 12/1970 Sens ...................... B65B 63/028
425/84

(Continued)

FOREIGN PATENT DOCUMENTS

DE          10026269 A1   11/2001
DE       202013101781 U1    9/2014
RU             65865 U1    8/2007

OTHER PUBLICATIONS

International Search Report and Written Opinion from PCT/US2018/058377 dated Feb. 13, 2019.

(Continued)

*Primary Examiner* — Jacob K Ackun
(74) *Attorney, Agent, or Firm* — Calfee, Halter & Griswold LLP

(57) ABSTRACT

A load unit (700) of material for forming a structural component made from layers of a fiber reinforced material, the load unit (700) comprising a pallet (704) and a single layer of rolls of fiber reinforced material (702).

21 Claims, 12 Drawing Sheets

(56) References Cited

U.S. PATENT DOCUMENTS

| | | | | |
|---|---|---|---|---|
| 4,177,897 | A | * | 12/1979 | Cole ................... B29C 65/7437 |
| | | | | 242/580 |
| 4,832,196 | A | | 5/1989 | Butler |
| 5,551,563 | A | | 9/1996 | Allen |
| 5,921,064 | A | * | 7/1999 | O'Connor ............ B65H 45/107 |
| | | | | 53/434 |
| 6,120,873 | A | * | 9/2000 | Grant ....................... D04H 3/02 |
| | | | | 52/406.1 |
| 6,321,511 | B1 | * | 11/2001 | O'Connor ............ B65H 45/107 |
| | | | | 493/413 |
| 7,311,199 | B2 | * | 12/2007 | Vantilt ................... B65D 75/38 |
| | | | | 53/436 |
| 8,226,866 | B2 | | 7/2012 | Arelt |
| 2013/0017385 | A1 | | 1/2013 | Lozoya-Lopez et al. |
| 2015/0108036 | A1 | | 4/2015 | Sakaguchi |

OTHER PUBLICATIONS

Office Action from Chinese Application No. 201880067358.2 dated Aug. 23, 2021.
Office Action from Chinese Application No. 201880067358.2 dated Feb. 8, 2022.
Office Action from Indian Application No. 202037024078 dated Apr. 27, 2022.
Office Action from Russian Application No. 2020112205 dated Apr. 15, 2022.

* cited by examiner

600

PALLET WITH ROLLS OF REINFORCEMENT MATERIAL

RELATED APPLICATIONS

This application is the U.S. national stage entry of PCT/US2018/058377, filed on Oct. 31, 2018, which claims priority to and all benefit of U.S. Provisional Patent Application No. 62/591,867, filed on Nov. 29, 2017 and titled SPAR CAP PALLET SYSTEM, the entire disclosures of which are fully incorporated herein by reference.

FIELD

The general inventive concepts relate to fiber reinforced materials and, more particularly, to systems for and methods of using fiber reinforced materials to produce structural components.

BACKGROUND

It is known to use fiber reinforced materials, such as fabrics, mats, veils, and the like to form structural components. For example, U.S. Pat. No. 8,226,866 discloses production of a laminate by a continuous process. The process involves pulling tows of fibers (e.g., glass fibers or carbon fibers) through a bath of resin, wherein the resin is then cured to form the laminate. Within the laminate, the fibers are arranged side by side and substantially parallel to one another. Such a laminate is often referred to as a unidirectional laminate. The laminate can have a thickness of 1 mm to several mm. The laminate can be formed to have almost any practical width. After production, the sheet-like laminate is wound up into rolls, each having a length of a couple hundred of meters.

These laminates are useful for forming structural components. As noted in the '866 patent, these laminates can be stacked up or otherwise layered to form a spar cap of a blade of a wind energy turbine. In particular, several layers of cut pieces of the laminate are arranged on top of each other to form the structural component. The pieces are arranged within specific areas and regions of a mold. An infusion process introduces a curable matrix material (a resin) into the mold in order to penetrate the layers of the laminate. A vacuum can be applied to the mold during the infusion process to press the layers of cut pieces together and aid the resin in penetrating the layers.

A conventional system 100 for forming a structural component, in this case a spar cap of a wind turbine blade, will be described with reference to FIGS. 1-3. In the system 100, a machine 102 continuously produces a fiber reinforced material in the form of a woven fabric 104 having a predetermined width w. The fabric 104 includes or is otherwise reinforced with fibers (e.g., glass and/or carbon fibers) that extend substantially along a length of the fabric 104 (i.e., parallel to the arrow 106). As the fabric 104 exits the machine 102 and travels in a direction indicated by the arrow 106, the fabric 104 is wound at a roll area 108. A winder or other conveying means pulls the fabric 104 from the machine 102 to the roll area 108. Blades or other cutting means form slits 110 in the fabric 104 prior to the roll area 108. In this manner, discrete rolls 112 of the fabric 104 are formed. In the embodiment shown in FIG. 1, three slits 110 are made to form four rolls 112, with each roll 112 having an approximate width of w/4.

Once a predetermined quantity of the fabric 104 has been wound to the roll area 108, a manual cut 114 is made across the width w of the fabric 104, thereby separating the rolls 112 from the fabric 104 exiting the machine 102. The machine 102 may be stopped or otherwise paused during this cutting operation. Because the cut 114 is made manually (e.g., by an operator using shears), the ends of each roll 112 are not necessarily even. Nonetheless, a quantity (i.e., length) of the fabric 104 on each roll 112 is substantially the same.

As shown in FIG. 2, once the rolls 112 are separated from the fabric 104, a number of the rolls 112 are placed on a pallet 120 or otherwise packaged together for storage and/or transit, prior to use thereof. In FIG. 2, eight rolls 112 rest on the pallet 120. A typical footprint of the pallet 120 is 45 inches (width) by 54 inches (length).

When it is time to form the spar cap, one or more pallets 120 of rolls 112 are moved into proximity to a mold 128 used to form the spar cap. As noted above, the spar cap is formed by layering, such as by hand laying, a number of cut pieces of the fabric 104 from the rolls 112. The number and placement of the cut pieces within the mold 128 define the properties (e.g., shape, thickness) of the spar cap.

Since many cut pieces of the fabric 104 are required to form the spar cap, several rolls 112 must be used to provide the necessary quantity of the fabric 104. Each of the rolls 112 has a hollow inner core (e.g., made of cardboard). A lifting mechanism 140 situated in proximity to the mold 128 lifts one of the rolls 112 from the pallet 120 by engaging the hollow inner core and situates the roll 112 on a feeding mechanism 150 so that the hand laying process can commence. When the fabric 104 on the roll 112 is exhausted, the inner core is removed from the feeding mechanism 150 and the lifting mechanism 140 is used to deliver another roll 112 containing the fabric 104 to the feeding mechanism 150. This process is repeated until formation of the spar cap is complete.

Often, the rolls 112 are placed on the pallets 120 in a manner that maximizes the amount of material (e.g., the fabric 104) that can be packaged and shipped. This approach may introduce downstream handling problems in certain instances. For example, it may be difficult to position a pallet 120 in proximity to the mold 128 given its loading. Instead, as shown in FIG. 4, a method 400 of forming the spar cap requires removal of the rolls 112 from the pallet 120 at a location remote from the mold 128 (step 402). Given the size and shape of the rolls 112, an overhead crane or the like (at the remote location) must be used to unload the rolls 112 from the pallet 120. The rolls 112 are then placed on a cart or the like (step 404) for transport to the forming area including the mold 128 (step 406). Finally, the rolls 112 are removed from the cart (e.g., using the lifting mechanism 140) and delivered to the feeding mechanism 150 (step 408). These additional handling steps result in wasted resources (e.g., time, labor, equipment, floor space). Additionally, because the amount of material (e.g., the fabric 104) needed to form the spar cap may be more or less than that situated on a single pallet 120, multiple pallets 120 may need to be moved to and from the forming area including the mold 128, exacerbating the aforementioned handling problems.

In view of the above, there is an unmet need for improved systems for and methods of using fiber reinforced materials to produce structural components from rolls of material provided on pallets.

SUMMARY

It is proposed herein to provide improved systems for and methods of forming structural components from layers of a fibrous reinforcement material obtained from rolls of the material.

The general inventive concepts relate to and contemplate systems for and methods of using fibrous reinforcement materials to produce structural components from rolls of material provided on pallets. The rolls are configured on the pallets according to innovative configurations that allow the systems and the methods to achieve production benefits compared to conventional systems and methods.

In one exemplary embodiment, a system for forming a structural component is disclosed. The system comprises a plurality of rolls of a fibrous reinforcement material, wherein the rolls are arranged on one side of a unitary holder, wherein the rolls form a single layer on the holder, and wherein the rolls constitute between 100% to 103% of the amount of the fibrous reinforcement material required to form the structural component.

In one exemplary embodiment, the fibrous reinforcement material comprises glass fibers.

In one exemplary embodiment, the fibrous reinforcement material comprises carbon fibers.

In one exemplary embodiment, eight or fewer rolls are situated on the holder.

In one exemplary embodiment, each of the rolls is individually wrapped with a material prior to placement on the holder.

In one exemplary embodiment, each of the rolls includes a core to facilitate both placement on and removal from the holder.

In one exemplary embodiment, a gap between at least one pair of adjacent rolls is at least 50% the average width of the adjacent rolls.

In one exemplary embodiment, a gap between at least one pair of adjacent rolls is at least 100% the average width of the adjacent rolls.

In one exemplary embodiment, the average width of the adjacent rolls is within the range of 35 cm to 45 cm.

In one exemplary embodiment, a spacer is positioned in the gap.

In one exemplary embodiment, the dimensions of the spacer correspond to the dimensions of the gap.

In one exemplary embodiment, the spacer is a hollow body.

In one exemplary embodiment, a plurality of gaps exist between the rolls, and a spacer is positioned in each of the gaps.

In one exemplary embodiment, at least one of the rolls is positioned perpendicular to at least one of the other rolls.

In one exemplary embodiment, the rolls include a first roll of a first fibrous reinforcement material and a second roll of a second fibrous reinforcement material.

In one exemplary embodiment, the first fibrous reinforcement material is composed of fibers made of a first glass composition, and the second fibrous reinforcement material is composed of fibers made of a second glass composition.

In one exemplary embodiment, the first fibrous reinforcement material is composed of fibers having a first fiber diameter, and the second fibrous reinforcement material is composed of fibers having a second fiber diameter.

In one exemplary embodiment, the first fibrous reinforcement material is a fabric having a first areal density, and the second fibrous reinforcement material is a fabric having a second areal density.

In one exemplary embodiment, each of the first areal density and the second areal density is within the range of 970 g/m$^2$ to 1,800 g/m$^2$.

In one exemplary embodiment, the holder is a pallet.

In one exemplary embodiment, a length of the pallet is greater than a width of the pallet.

In one exemplary embodiment, the length is within the range of 70 inches to 100 inches.

In one exemplary embodiment, the width is within the range of 40 inches to 60 inches.

In one exemplary embodiment, the holder is wrapped with a material to encase the rolls thereon.

In one exemplary embodiment, the fibrous reinforcement material is a unidirectional fabric.

In one exemplary embodiment, the structural component is a spar cap.

In one exemplary embodiment, a method of forming the structural component from the rolls on the pallet is disclosed.

Numerous other aspects, advantages, and/or features of the general inventive concepts will become more readily apparent from the following detailed description of exemplary embodiments, from the claims, and from the accompanying drawings being submitted herewith.

BRIEF DESCRIPTION OF THE DRAWINGS

The general inventive concepts, as well as embodiments and advantages thereof, are described below in greater detail, by way of example, with reference to the drawings in which.

DETAILED DESCRIPTION

Figure 1:
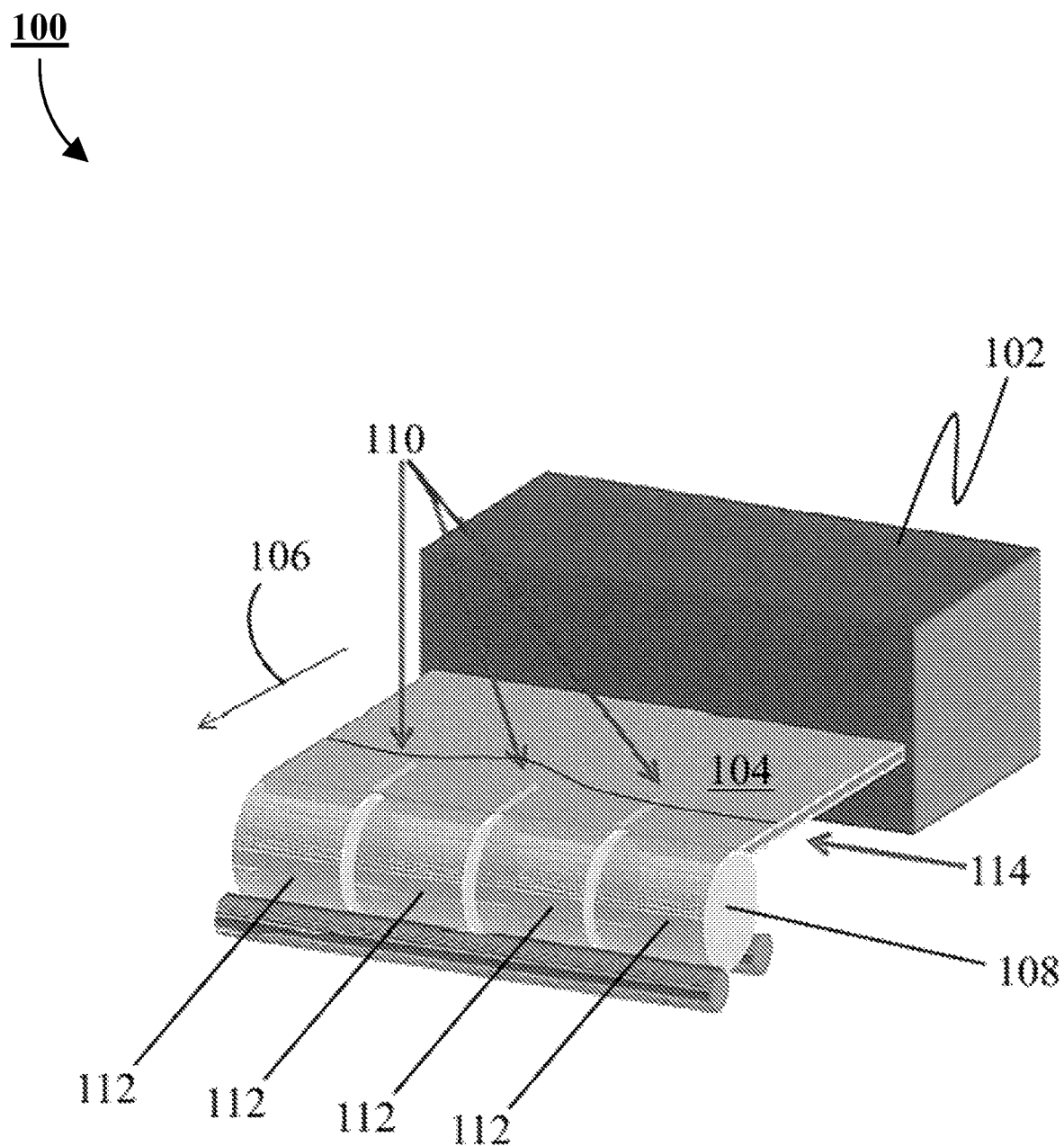
FIG. 1 is a diagram of a conventional system for forming a woven fabric.

While the general inventive concepts are susceptible of embodiment in many different forms, there are shown in the drawings, and will be described herein in detail, specific embodiments thereof with the understanding that the present disclosure is to be considered as an exemplification of the principles of the general inventive concepts. Accordingly, the general inventive concepts are not intended to be limited to the specific embodiments illustrated herein.

The general inventive concepts encompass systems for and methods of forming structural components from layers of a fiber reinforced material obtained from rolls of the material.

Figure 5:
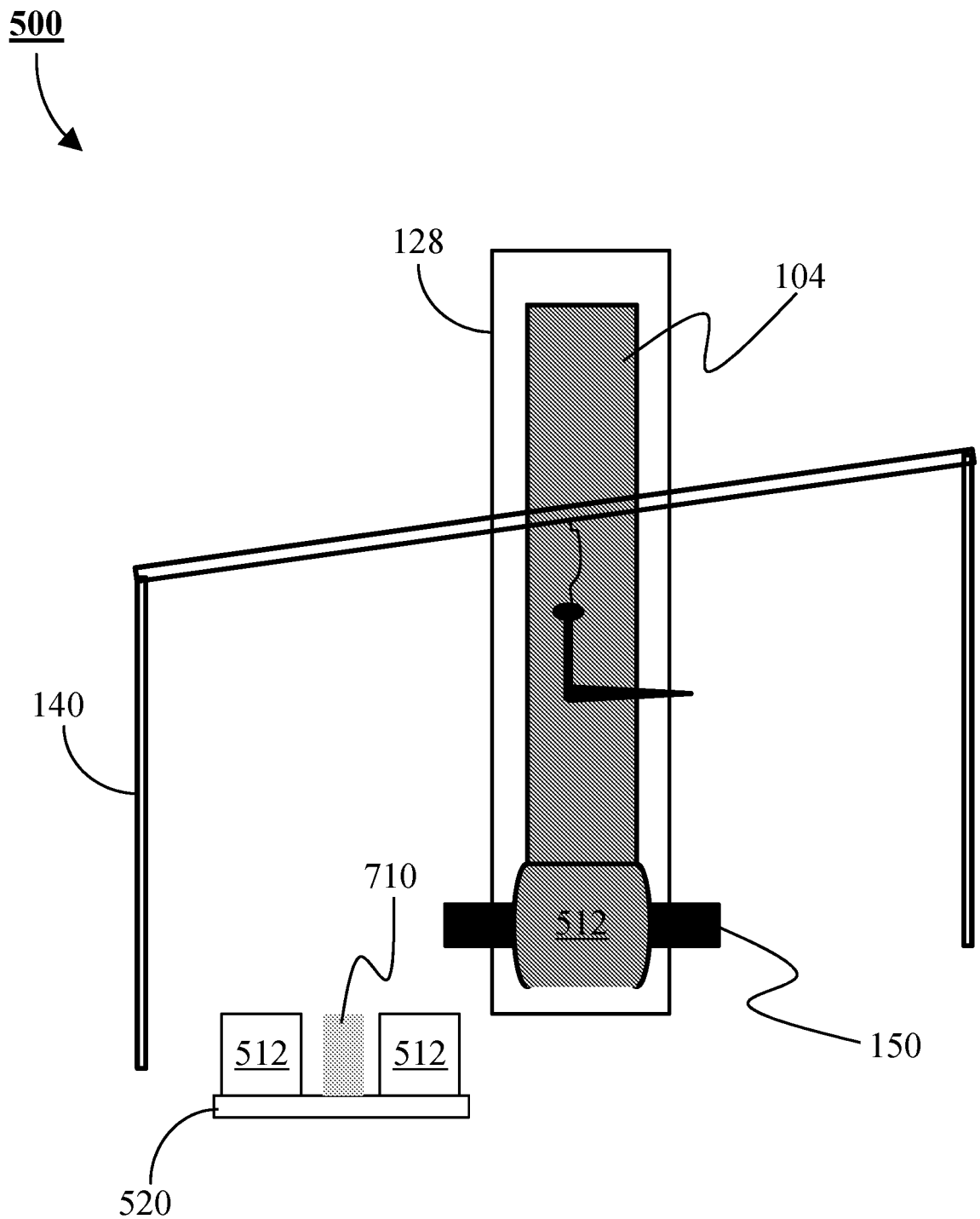
FIG. 5 is a diagram of a system for forming a structural component, such as a spar cap, according to an exemplary embodiment.

A system 500 for forming a structural component (e.g., a spar cap), according to an exemplary embodiment, will be described with reference to FIG. 5. In the system 500, a pallet 520 containing a plurality of rolls 512 of a fiber reinforced material (e.g., the fabric 104) is prepared and shipped to a facility for forming the spar cap.

The spar cap can be formed in any suitable manner. For example, as known in the art, the spar cap can be formed by layering, such as by hand laying, a number of cut pieces of the fabric 104 from the rolls 512 into a mold 128. The number and placement of the cut pieces within the mold 128 define the properties (e.g., shape, thickness) of the spar cap.

Figure 6:
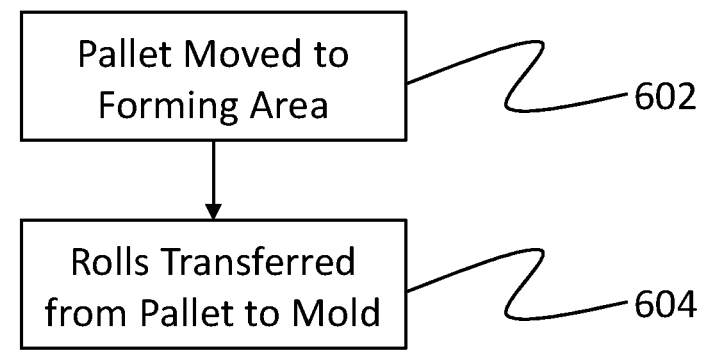
FIG. 6 is a flowchart of a method of delivering a pallet of rolls to a forming area, according to an exemplary embodiment.

When it is time to form the spar cap, a pallet 520 is moved into proximity to a mold 128 used to form the spar cap. Because of the innovative configuration of the pallet 520, the pallet 520 can be readily moved from any location in the facility (e.g., a staging area) to the forming area including the mold 128. For example, the pallet 520 can be moved to the forming area using a forklift, a pallet jack, or the like, as opposed to using larger, more specialized equipment such as an overhead crane. In this manner, the rolls 512 on the pallet 520 can be moved to the forming area without first being removed from the pallet 520. Consequently, as shown in FIG. 6, a method 600 of forming a spar cap based on the pallet 520 is more efficient than the conventional method 400.

In the method 600 of forming the spar, the pallet 520 is initially situated at a location (e.g., a staging area) remote from the forming area including the mold 128. As noted above, because of the configuration of the pallet 520 and the rolls 512 thereon, the pallet 520 itself is readily movable to the forming area (step 602). Thereafter, the rolls 512 are removed from the pallet 520 (e.g., using the lifting mechanism 140) and delivered to the feeding mechanism 150 (step 604). Thus, the additional handling steps encountered in the method 400 are avoided, preventing or otherwise reducing wasted resources (e.g., time, labor, equipment, floor space).

Additionally, because the pallet 520 is configured to only include the amount (e.g., usually with an excess of no more than 3%) of the fabric 104 needed to form the spar cap, the problem of needing more or fewer pallets to form the spar cap is avoided.

The pallet configurations contemplated by the general inventive concepts are driven by placement of an amount of the fiber reinforced material needed to produce a structural component on the pallet, as opposed to the conventional approach of maximizing an amount of the fiber reinforced material on the pallet. Thus, while it is common for conventional pallets to include 8, 9, 10, 11, 12, 13, or even more rolls of a fiber reinforced material, the inventive pallet configurations are based on the amount of fiber reinforced material needed to form the spar cap and will often include 8 or fewer total rolls.

Figure 2:
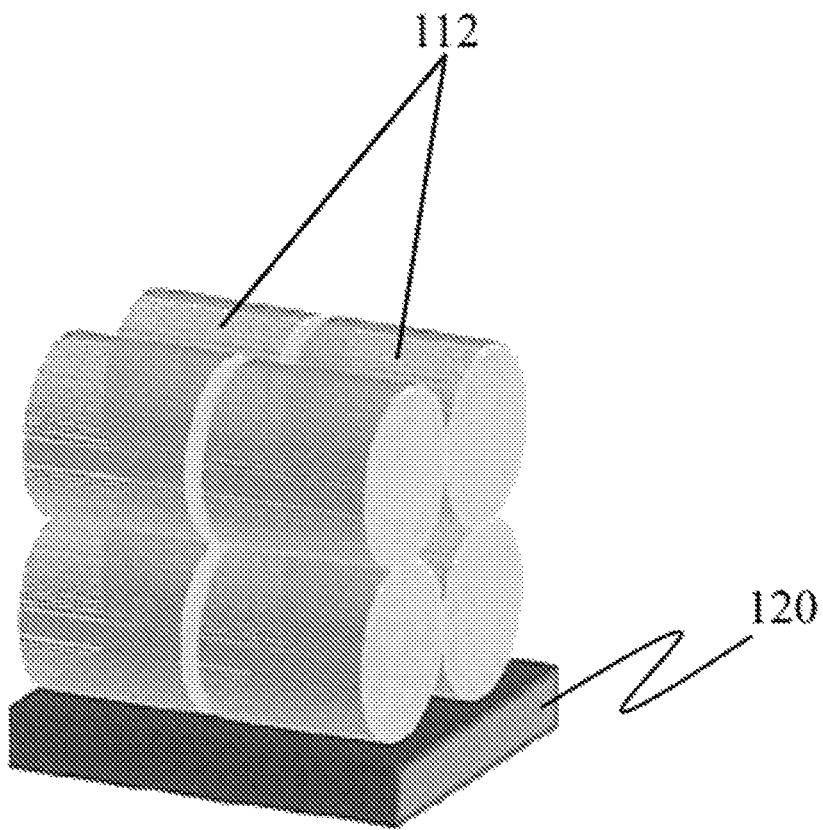
FIG. 2 is a diagram of rolls of the woven fabric produced by the system of FIG. 1.
Figure 3:
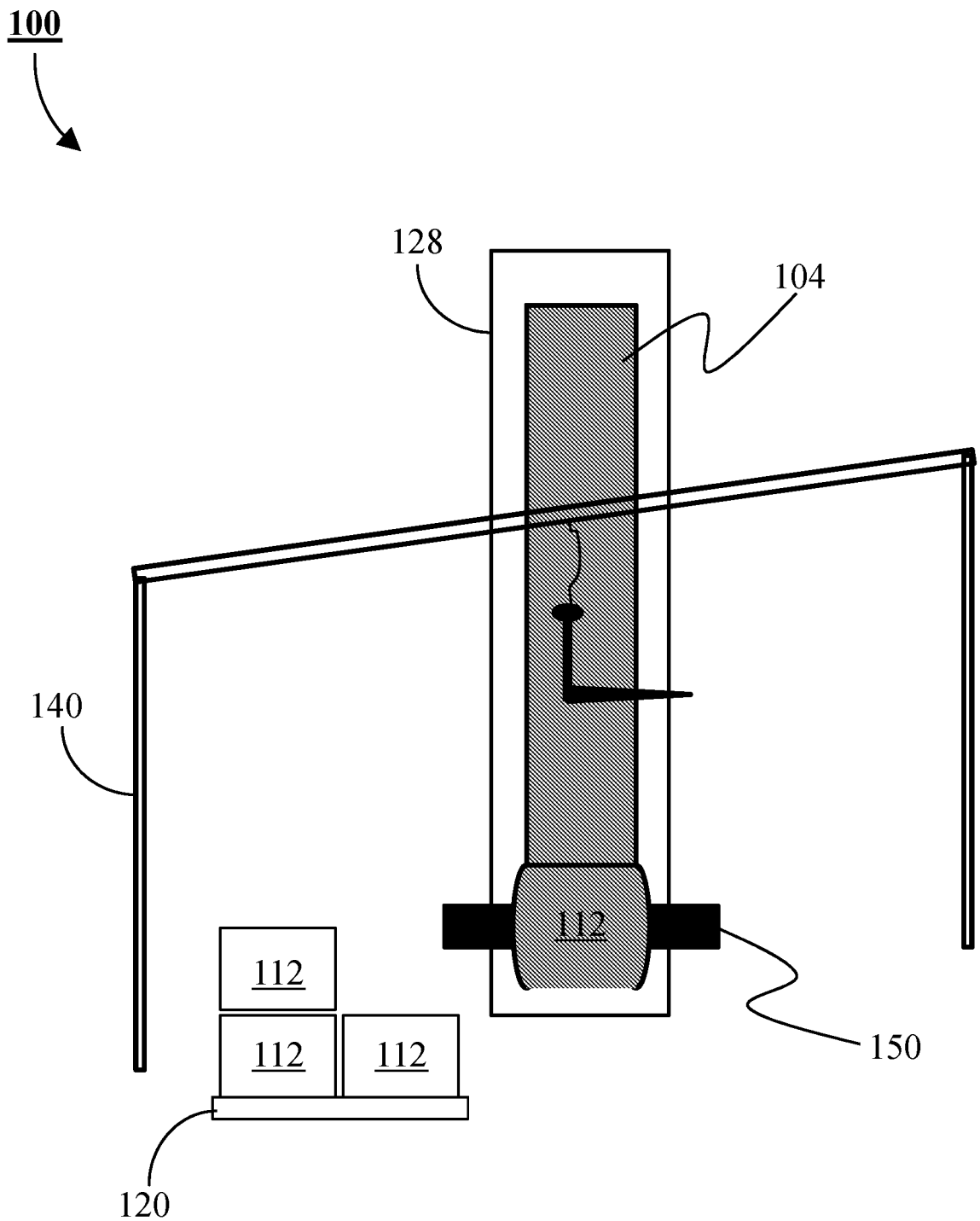
FIG. 3 is a diagram showing use of the rolls of FIG. 2 during production of a spar cap.
Figure 4:
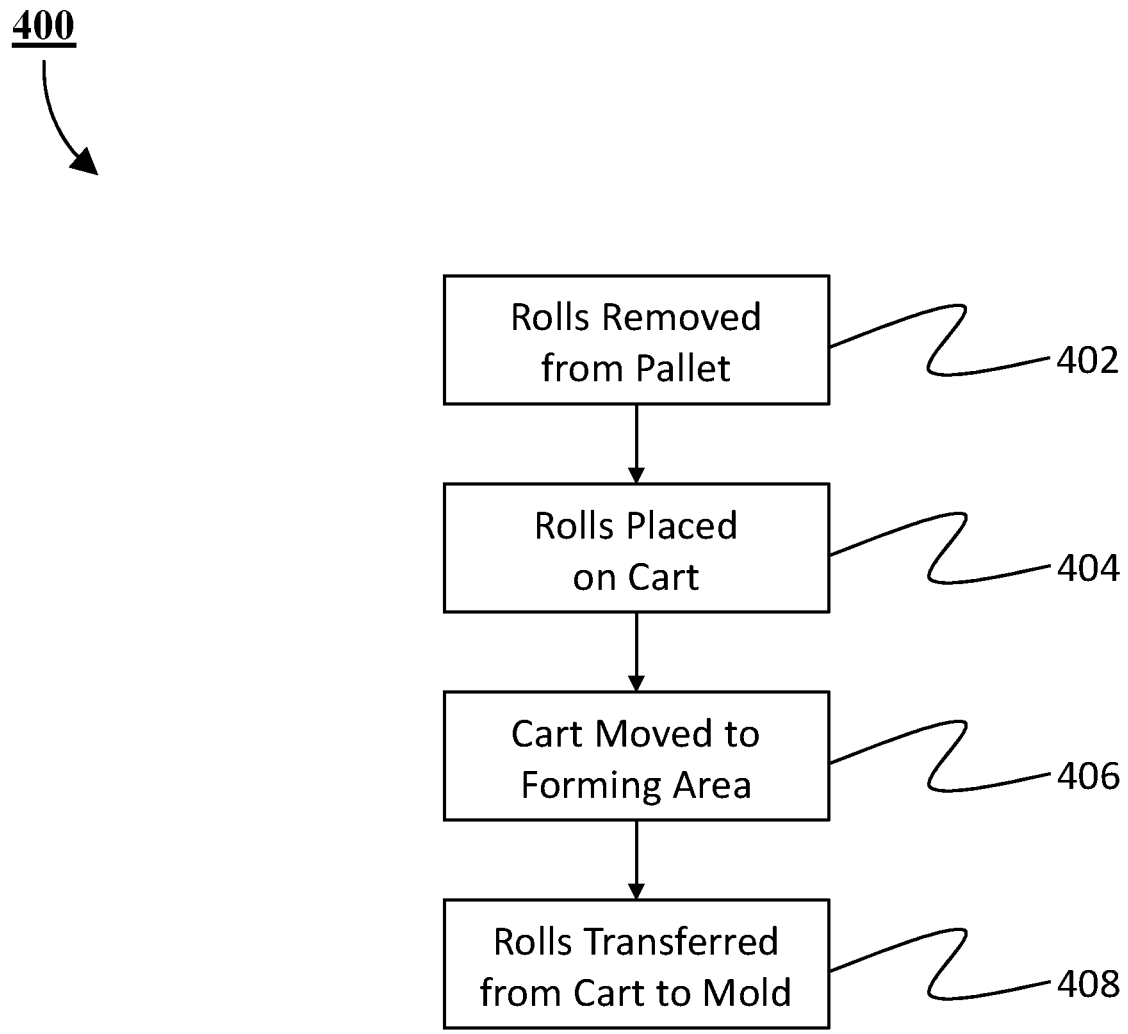
FIG. 4 is a flowchart of a conventional method of delivering a pallet of rolls to a forming area.

Furthermore, while it is common for conventional pallets to stack rolls of a fiber reinforced material on top of one another (see FIG. 2), the inventive pallet configurations will generally only include a single layer of such rolls.

Further still, while it is common for conventional pallets to place rolls immediately adjacent to one another (i.e., to minimize inter-roll spacing), again to maximize an amount of the fiber reinforced material on the pallet, the inventive pallet configurations generally include predefined significant spacings between certain of the rolls on the pallet to facilitate removal of the rolls from the pallet and, thus, formation of the spar cap.

In some exemplary embodiments, the pallet configuration will include a plurality of rolls, wherein the fabric on at least one roll will differ from the fabric on another roll on the pallet. The selection of these different fabric types is driven by the type of structural component being formed and the desired properties thereof. The rolls of fabric may differ, for example, by fiber composition (e.g., glass type), fiber dimensions (e.g., diameter), fiber orientation, fabric form (e.g., woven, non-woven), etc.

Figure 7A:
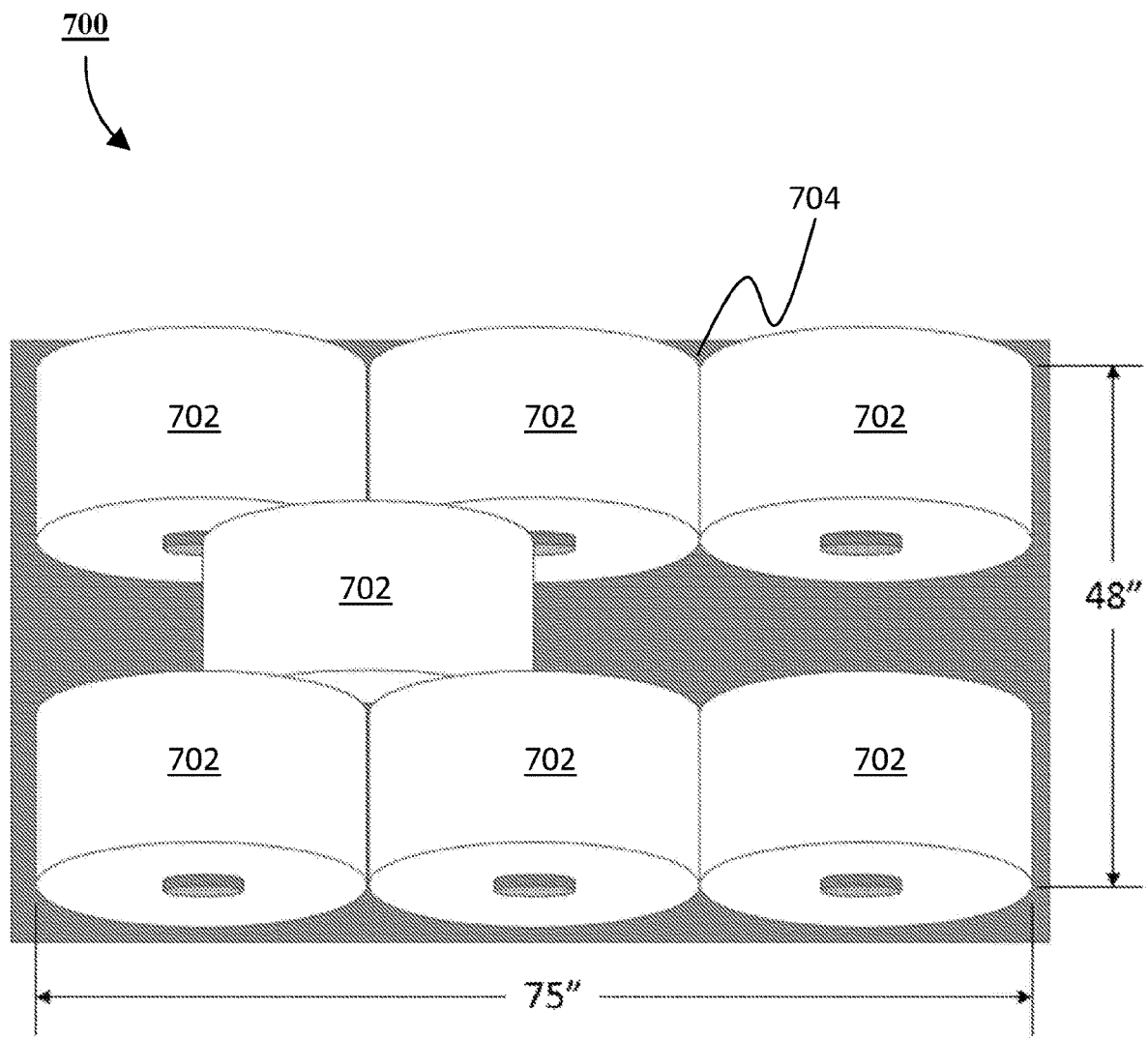
FIGS. 7A, 7B, and 7C are diagrams showing a pallet configuration, according to an exemplary embodiment.
Figure 7B:
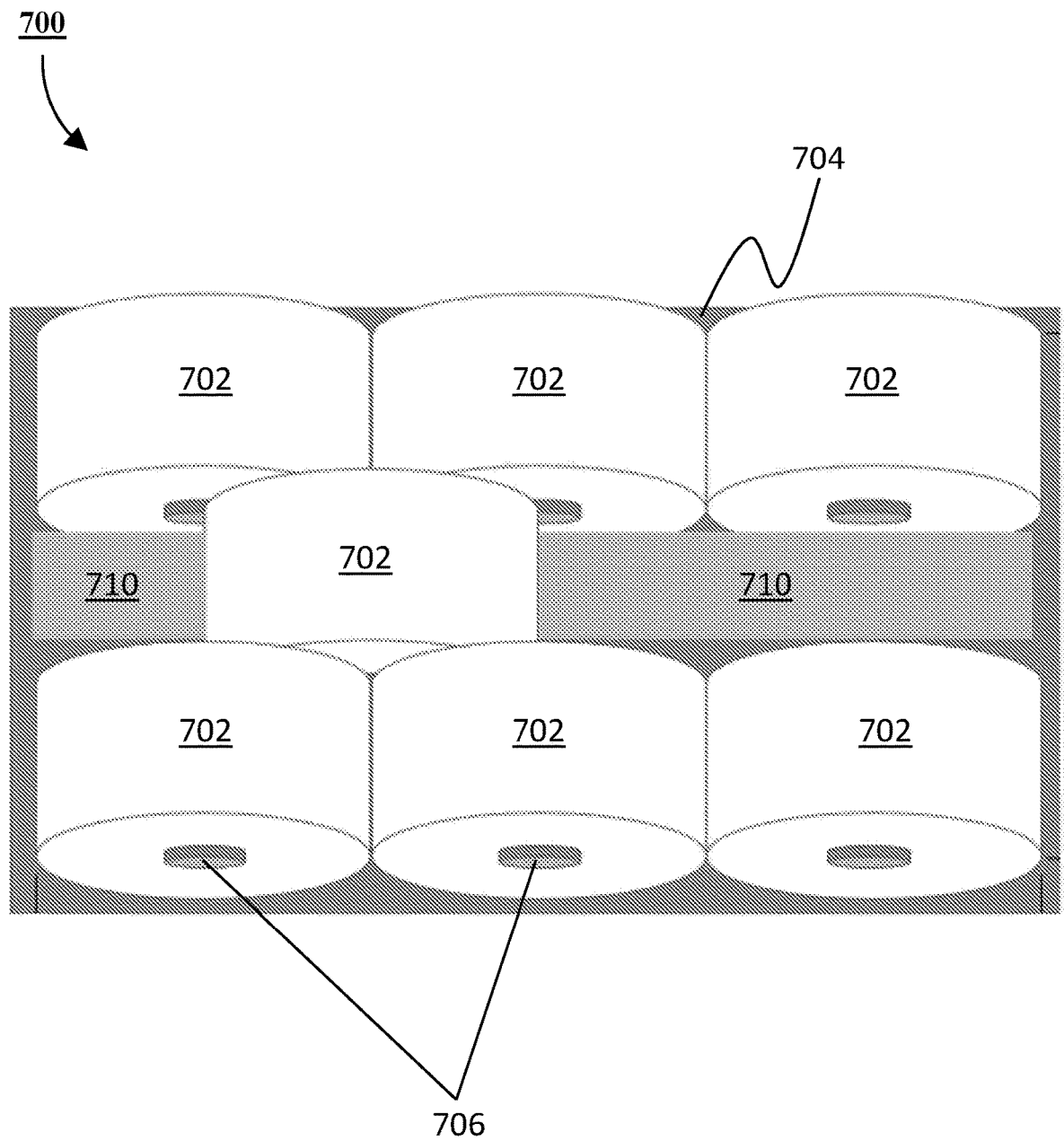
Figure 7C:
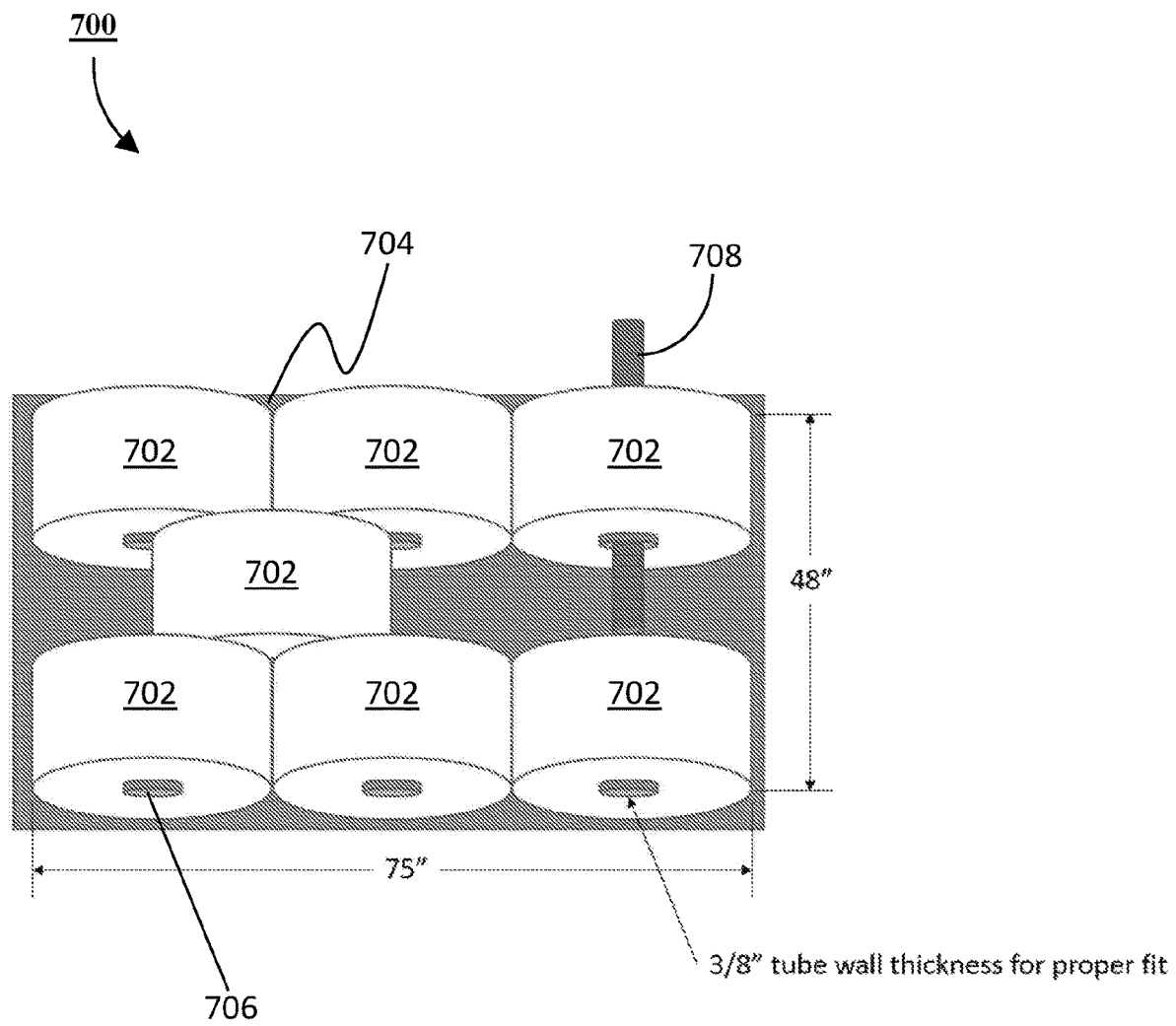

A pallet configuration 700, according to an exemplary embodiment, is illustrated in FIGS. 7A-7C. The pallet configuration 700 includes seven (7) rolls 702 of a fabric (e.g., the fabric 104) situated on a pallet 704 (e.g., the pallet 520). The rolls 702 can have any suitable dimensions and contain any suitable fiber reinforced material for production of a structural component (e.g., a spar cap). For example, the rolls 702 can have a width of approximately 40 cm and contain a predetermined length (e.g., 250 m) of a unidirectional, non-woven fabric having an areal weight of approximately 1,800 $g/m^2$.

Likewise, the pallet 704 can have any dimensions (thickness, length, width) suitable for supporting the rolls 702 during shipping and storage thereof. Typically, a length of the pallet 704 will be greater than a width of the pallet 704. In some exemplary embodiments, the length of pallet 704 is between 70 inches and 100 inches. In some exemplary embodiments, the length of the pallet 702 is approximately 75 inches. In some exemplary embodiments, the length of the pallet 702 is approximately 80 inches. In some exemplary embodiments, the length of the pallet 702 is approximately 90 inches. In some exemplary embodiments, the width of pallet 704 is between 40 inches and 60 inches. In some exemplary embodiments, the width of the pallet 702 is approximately 45 inches. In some exemplary embodiments, the width of the pallet 702 is approximately 48 inches. In some exemplary embodiments, the width of the pallet 702 is approximately 50 inches.

Each of the rolls 702 includes a core 706 (e.g., a cardboard core) extending through its center. The core 706 facilitates movement of the rolls 702 on and off the pallet 704. For example, each core 706 is sized and shaped so as to receive a lifting member 708 that facilitates lifting of the roll 702 by a lifting mechanism (e.g., the lifting mechanism 140), such as an overhead/gantry crane (see FIG. 5).

Typically, before placement on the pallet 704, each of the rolls 702 will be wrapped in plastic or some other covering to protect the fabric on the rolls. Once the rolls 702 are positioned on the pallet 704 in the desired configuration, one or more spacers 710 are situated in any large gaps formed between the rolls 702. A size and shape of each spacer 710 will typically correspond to the size and shape of the gap being filled.

The spacers 710 can be made of any suitable material, for example, cardboard. In some exemplary embodiments, the spacers 710 are hollow. The spacers 710 provide added stability to the pallet 704 by maintaining the inter-roll spacings defined by the pallet configuration 700.

Finally, the entire pallet 704 including the rolls 702 may be wrapped in plastic or the like (e.g., shrinkwrapped) to further stabilize the pallet 704 and prevent movement of the rolls 702 thereon.

When it comes time to use the rolls 702 on the pallet 704, such as to form a spar cap, the outer wrapping is removed from the pallet 704, the lifting member 708 is inserted through or otherwise interfaced with a core 706 of a roll 702 to be removed from the pallet 704, the roll 702 is lifted directly off the pallet 704, and the roll 702 is situated in proximity to a mold (e.g., the mold 128) to form the spar cap.

Figure 8A:
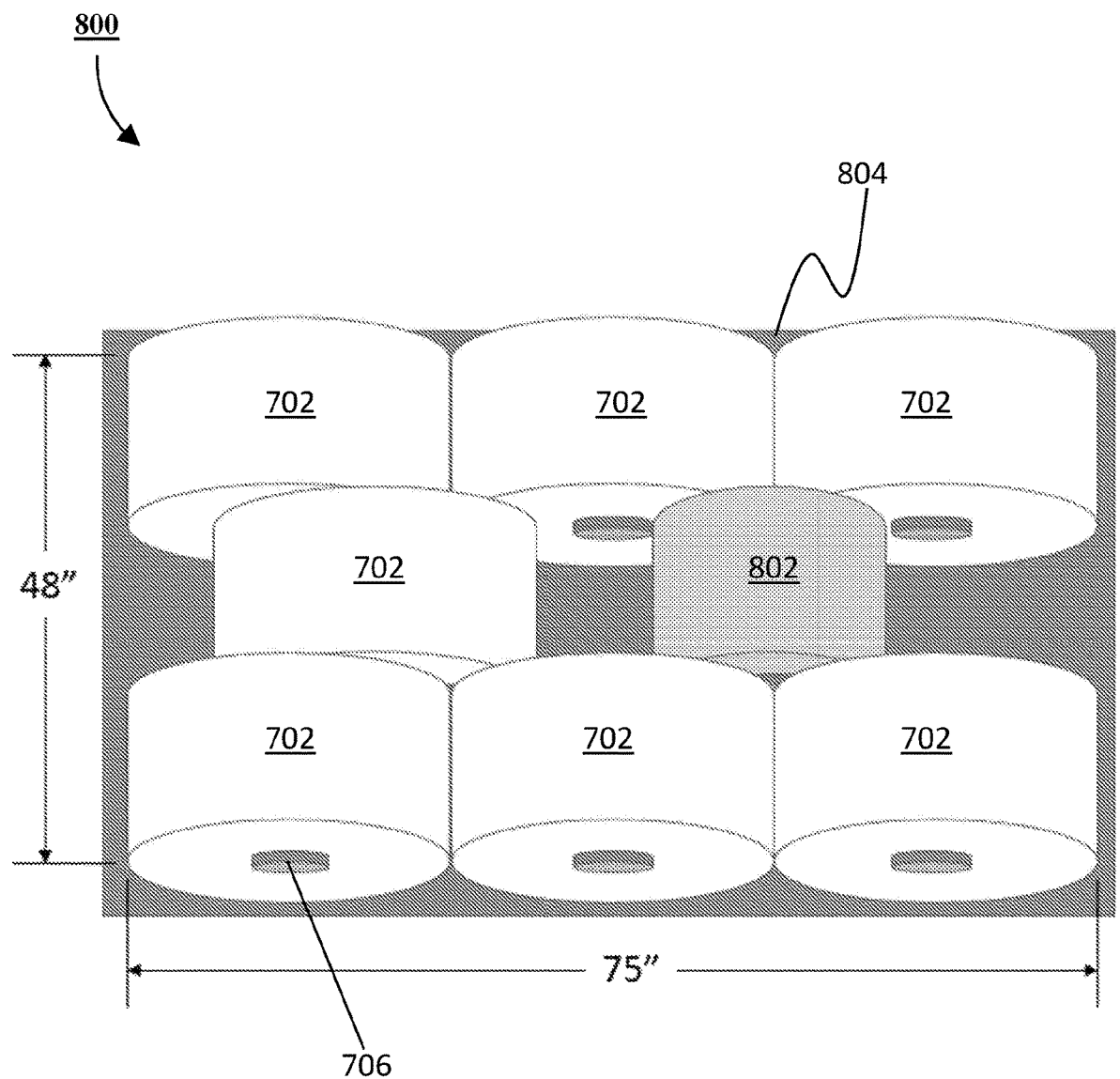
FIGS. 8A and 8B are diagrams showing a pallet configuration, according to a second exemplary embodiment.
Figure 8B:
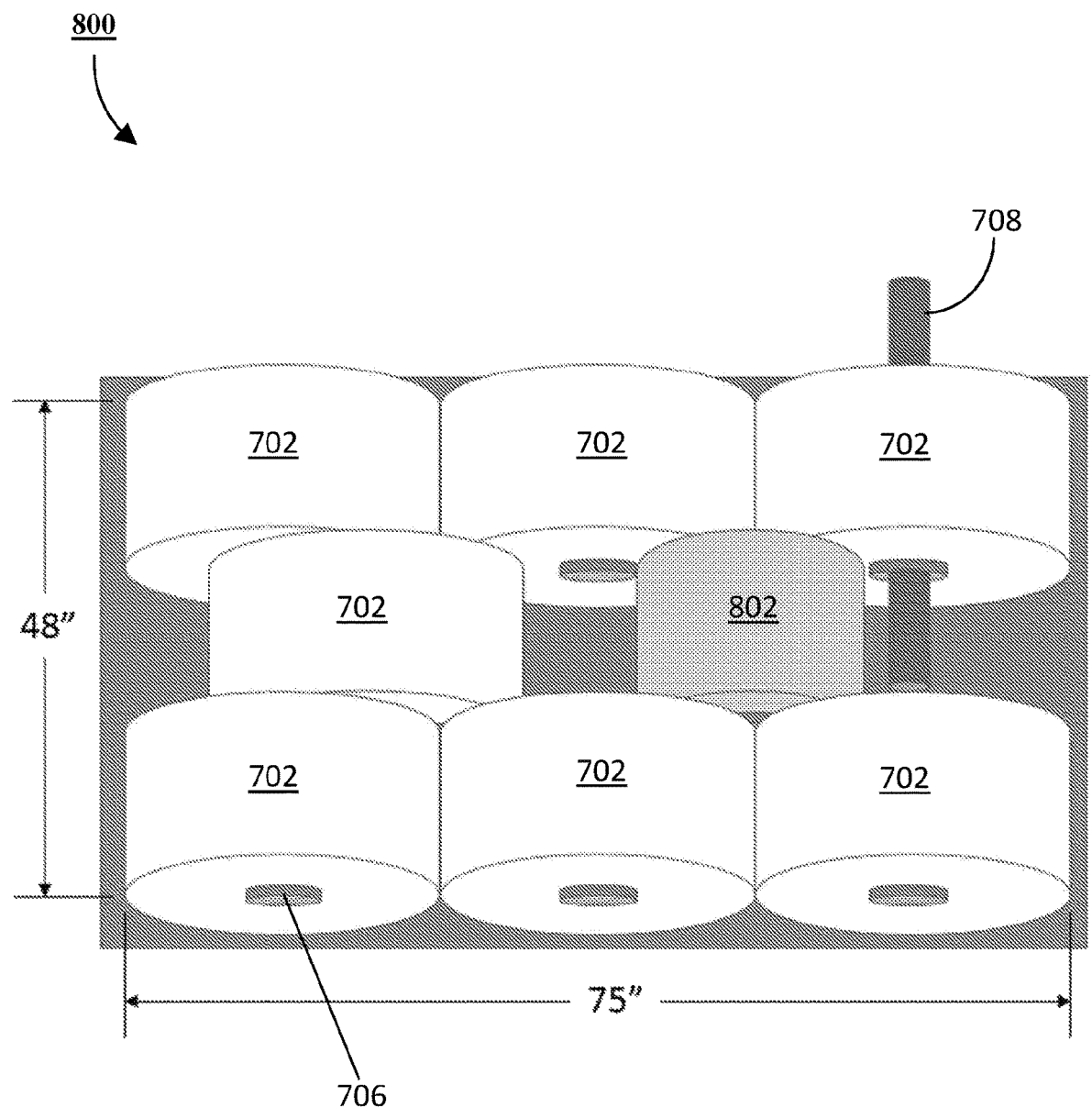

A pallet configuration 800, according to another exemplary embodiment, is illustrated in FIGS. 8A-8B. The pallet configuration 800 is similar to the pallet configuration 700 in many ways. For example, the pallet configuration 800 includes seven (7) rolls 702 of a first fabric (e.g., the fabric 104) situated on a pallet 804 (e.g., the pallet 520). The pallet configuration 800 differs from the pallet configuration 700, however, in that the pallet configuration 800 includes a roll 802 containing a second fabric that differs from the first fabric. For example, while the first fabric has an areal density of approximately 1,800 g/m$^2$, the second fabric has an areal density of approximately 970 g/m$^2$. The combination of the quantity of the first fabric and the quantity of the second fabric, as defined by the pallet configuration 800, are needed to form the spar cap having the desired properties.

In some exemplary embodiments, the pallet configuration 800 includes more than one roll 802 containing the second fabric.

In some exemplary embodiments, the pallet configuration 800 includes more than two different types of fabric.

In some exemplary embodiments, the pallet configuration 800 includes fabrics having different areal densities, for example, a second fabric having an areal density of approximately 1,020 g/m$^2$.

In some exemplary embodiments, the pallet configuration 800 includes rolls of the same fabric, but the rolls have different dimensions. In some exemplary embodiments, the pallet configuration 800 includes rolls of different fabrics, but the rolls have the same dimensions. Regardless, the shape and size of any spacers (e.g., the spacers 710) that are used can be chosen based on the inter-roll spacings defined by the pallet configuration 800.

Figure 9:
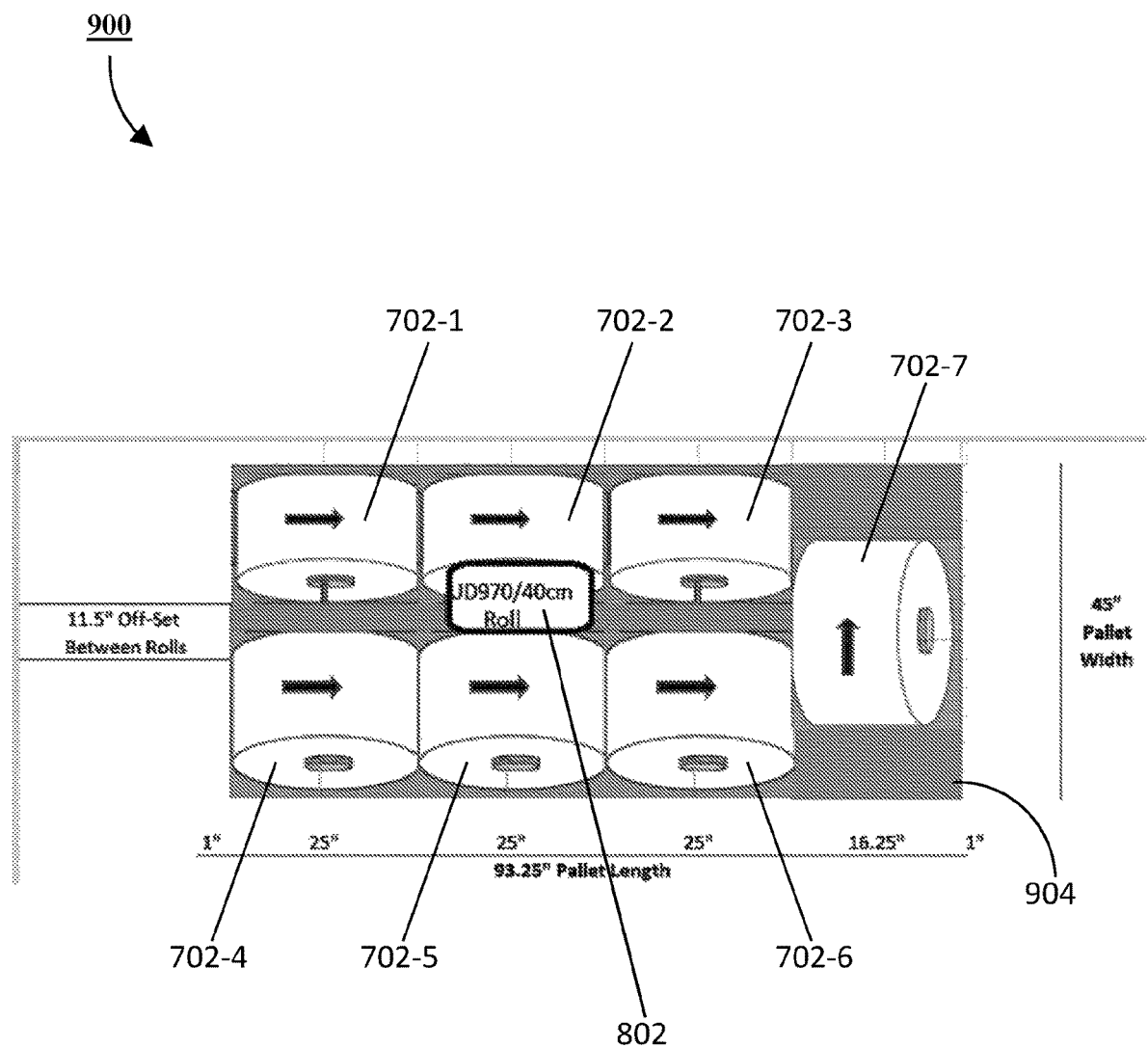
FIG. 9 is a diagram showing a pallet configuration, according to a third exemplary embodiment.

A pallet configuration 900, according to another exemplary embodiment, is illustrated in FIG. 9. The pallet configuration 900 is similar to the pallet configuration 800 in many ways. For example, the pallet configuration 900 includes seven (7) rolls 702-1, 702-2, 702-3, 702-4, 702-5, 702-6, and 702-7 of a first fabric (e.g., the fabric 104) and a single roll 802 of a second fabric situated on a pallet 904 (e.g., the pallet 520). The pallet configuration 900 differs from the pallet configuration 800, however, in that one of the rolls of the first fabric (i.e., roll 702-7) is oriented in a different direction on the pallet 904 than the other rolls of the first fabric (i.e., rolls 702-1, 702-2, 702-3, 702-4, 702-5, and 702-6). This difference in orientation is approximately 90 degrees and is highlighted in FIG. 9 by the arrows on the rolls of the first fabric. While the overall length of the pallet 904 may have increased because of the pallet configuration 900, ease of removal of the rolls from the pallet 904 is further enhanced.

In some exemplary embodiments, the pallet configuration 900 includes more than one roll 802 containing the second fabric.

In some exemplary embodiments, the pallet configuration 900 includes more than two different types of fabric.

In some exemplary embodiments, the pallet configuration 900 includes fabrics having different areal densities, for example, a second fabric having an areal density of approximately 1,020 g/m$^2$.

In some exemplary embodiments, the pallet configuration 900 includes rolls of the same fabric, but the rolls have different dimensions. In some exemplary embodiments, the pallet configuration 900 includes rolls of different fabrics, but the rolls have the same dimensions. Regardless, the shape and size of any spacers (e.g., the spacers 710) that are used can be chosen based on the inter-roll spacings defined by the pallet configuration 900.

It will be appreciated that the scope of the general inventive concepts is not intended to be limited to the particular exemplary embodiments shown and described herein. From the disclosure given, those skilled in the art will not only understand the general inventive concepts and their attendant advantages, but will also find apparent various changes and modifications to the methods and systems disclosed. It is sought, therefore, to cover all such changes and modifications as fall within the spirit and scope of the general inventive concepts, as described and claimed herein, and any equivalents thereof. For example, while the exemplary embodiments shown and described herein often reference production of a spar cap, the general inventive concepts are not so limited and instead are applicable to the production of any structural component formed (at least in part) from discrete layers of a fiber reinforced material obtained from rolls of the material.

What is claimed is:

1. A system for forming a structural component from a predetermined amount of a fibrous reinforcement material by placement of a plurality of layers of the fibrous reinforcement material in a mold, the system comprising a plurality of rolls of the fibrous reinforcement material and a unitary holder on which the rolls are arranged,
   wherein a first roll of the fibrous reinforcement material is operable to form a first number of the layers of the structural component,
   wherein a second roll of the fibrous reinforcement material is operable to form a second number of the layers of the structural component,
   wherein the rolls are arranged on one side of the holder,
   wherein the rolls form a single layer on the holder, and
   wherein the rolls constitute no less than 100% and no more than 103% of the predetermined amount of the fibrous reinforcement material.

2. The system of claim 1, wherein the fibrous reinforcement material comprises at least one of glass fibers and carbon fibers.

3. The system of claim 1, wherein eight or fewer rolls are situated on the holder.

4. The system of claim 1, wherein each of the rolls is individually wrapped with a material prior to placement on the holder.

5. The system of claim 1, wherein each of the rolls includes a core to facilitate both placement on and removal from the holder.

6. The system of claim 1, wherein a gap between at least one pair of adjacent rolls on the holder is at least 50% the average width of the adjacent rolls.

7. The system of claim 1, wherein a gap between at least one pair of adjacent rolls on the holder is at least 100% the average width of the adjacent rolls.

8. The system of claim 6, wherein the average width is within the range of 35 cm to 45 cm.

9. The system of claim 6, wherein a spacer is positioned in the gap.

10. The system of claim 9, wherein the dimensions of the spacer correspond to the dimensions of the gap.

11. The system of claim 9, wherein the spacer is hollow.

12. The system of claim 1, wherein at least one of the rolls is positioned such that a central axis of the roll is perpendicular to a central axis of at least one of the other rolls.

13. The system of claim 1, wherein the first roll comprises a first fibrous reinforcement material and the second roll comprises a second fibrous reinforcement material, and
    wherein the first fibrous reinforcement material differs from the second fibrous reinforcement material.

14. The system of claim 13, wherein the first fibrous reinforcement material is composed of fibers made of a first glass composition, and wherein the second fibrous reinforcement material is composed of fibers made of a second glass composition.

15. The system of claim 13, wherein the first fibrous reinforcement material is composed of fibers having a first fiber diameter, and wherein the second fibrous reinforcement material is composed of fibers having a second fiber diameter.

16. The system of claim 13, wherein the first fibrous reinforcement material is a fabric having a first areal density, and wherein the second fibrous reinforcement material is a fabric having a second areal density.

17. The system of claim 16, wherein each of the first areal density and the second areal density is within the range of 970 g/m$^2$ to 1,800 g/m$^2$.

18. The system of claim 1, wherein the holder is a pallet.

19. The system of claim 1, wherein the holder is wrapped with a material to encase the rolls thereon.

20. The system of claim 1, wherein the first number of first the layers differs from the second number of the layers.

21. The system of claim 1, wherein the first roll constitutes no less than 100% and no more than 103% of the amount of the fibrous reinforcement material required to form the first number of the layers, and
wherein the second roll constitutes no less than 100% and no more than 103% of the amount of the fibrous reinforcement material required to form the second number of the layers.

* * * * *